US012319766B2

United States Patent
Sugihara et al.

(10) Patent No.: US 12,319,766 B2
(45) Date of Patent: Jun. 3, 2025

(54) CORE-SHELL-TYPE POLYMER FINE PARTICLES HAVING PHOSPHONIC ACID OR PHOSPHONIC ACID ESTER STRUCTURE, PARTICLE DISPERSION, MOLDED ARTICLE, AND METHOD FOR PRODUCING SAID FINE PARTICLES

(71) Applicant: MARUZEN PETROCHEMICAL CO., LTD., Chuo-ku (JP)

(72) Inventors: Shinji Sugihara, Fukui (JP); Masahiro Endo, Ichihara (JP)

(73) Assignee: MARUZEN PETROCHEMICAL CO., LTD., Chuo-ku (JP)

( * ) Notice: Subject to any disclaimer, the term of this patent is extended or adjusted under 35 U.S.C. 154(b) by 622 days.

(21) Appl. No.: 17/639,555

(22) PCT Filed: Sep. 1, 2020

(86) PCT No.: PCT/JP2020/033050
§ 371 (c)(1),
(2) Date: Mar. 1, 2022

(87) PCT Pub. No.: WO2021/045041
PCT Pub. Date: Mar. 11, 2021

(65) Prior Publication Data
US 2022/0332874 A1   Oct. 20, 2022

(30) Foreign Application Priority Data

Sep. 2, 2019   (JP) ................................. 2019-159624

(51) Int. Cl.
*C08F 275/00* (2006.01)
*C08F 226/10* (2006.01)
(Continued)

(52) U.S. Cl.
CPC .......... *C08F 275/00* (2013.01); *C08F 226/10* (2013.01); *C08F 230/02* (2013.01); *C08F 257/02* (2013.01); *C08F 263/04* (2013.01)

(58) Field of Classification Search
CPC ...... C08F 255/00–10; C08F 257/00–02; C08F 259/00–08; C08F 261/00–12;
(Continued)

(56) References Cited

U.S. PATENT DOCUMENTS

2007/0259987 A1 * 11/2007 Schattka ............... C08F 265/06
523/105
2009/0123742 A1   5/2009 Vandermeulen et al.
(Continued)

FOREIGN PATENT DOCUMENTS

| JP | 2007-531726 A | 11/2007 |
| JP | 5464935 B2 | 4/2014 |
| JP | 2015-515633 A | 5/2015 |

OTHER PUBLICATIONS

International Search Report mailed on Nov. 17, 2020 in PCT/JP2020/033050 filed on Sep. 1, 2020, 2 pages.
(Continued)

*Primary Examiner* — Kregg T Brooks
(74) *Attorney, Agent, or Firm* — Oblon, McClelland, Maier & Neustadt, L.L.P.

(57) ABSTRACT

A core-shell type polymeric particle may exhibit good dispersibility in an aqueous medium and excellent flame retardance. A core-shell type polymeric particle may include a core including a hydrophobic polymer (c) and a shell including a copolymer having a repeating unit (a) derived from vinyl phosphonic acid or a vinyl phosphonic acid ester and a repeating unit (b) of formula (α):
(Continued)

SEM IMAGE

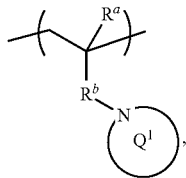 (α)

wherein $R^a$ is H or a methyl group, $R^b$ is a single bond or a carbonyl group, and ring $Q^1$ is a substituted or unsubstituted 4 to 10 membered nitrogen-containing heterocycle.

14 Claims, 5 Drawing Sheets

(51) Int. Cl.
    *C08F 230/02*     (2006.01)
    *C08F 257/02*     (2006.01)
    *C08F 263/04*     (2006.01)

(58) Field of Classification Search
CPC ............ C08F 263/00–08; C08F 277/00; C08F 279/00–06; C08F 230/02; C08F 20/54; C08F 20/58; C08F 20/60; C08F 26/06–10; C08F 226/06–10
See application file for complete search history.

(56) References Cited

U.S. PATENT DOCUMENTS

| 2009/0183647 A1* | 7/2009 | Jarek ...................... B41M 5/368 101/454 |
| 2015/0133618 A1 | 5/2015 | Hanssen et al. |
| 2018/0093113 A1 | 4/2018 | Schade et al. |

OTHER PUBLICATIONS

Ali et al., "Synthesis of poly(2-hydroxypropyl methacrylate) latex particles via aqueous dispersion polymerization," 2007, The Royal Society of Chemistry 2007, www.rsc.org/softmatter, DOI: 10.1039/b704425a, pp. 1003-1013 (11 pages).

Binauld et al., "Emulsion Polymerization of Vinyl Acetate in the Presence of Different Hydrophilic Polymers Obtained by RAFT/MADIX," 2014, Macromolecules 2014, pubs.acs.org/Macromolecules, dx.doi.org/10.1021/ma402549x, pp. 3461-3472 (12 pages).

Extended European Search Report issued Aug. 17, 2023 in European Patent Application No. 20860168.2, 6 pages.

* cited by examiner

SEM IMAGE

¹H NMR SPECTRUM IN CDCl₃

¹H NMR SPECTRUM IN HEAVY WATER

SEM IMAGE

SEM IMAGE

TEM IMAGE

SEM IMAGE

SEM IMAGE

CORE-SHELL-TYPE POLYMER FINE PARTICLES HAVING PHOSPHONIC ACID OR PHOSPHONIC ACID ESTER STRUCTURE, PARTICLE DISPERSION, MOLDED ARTICLE, AND METHOD FOR PRODUCING SAID FINE PARTICLES

CROSS-REFERENCE TO RELATED APPLICATIONS

The present application is the national stage of international application PCT/JP2020/033050, filed on Sep. 1, 2020, and claims the benefit of the filing date of Japanese Appl. No. 2019-159624, filed on Sep. 2, 2019.

TECHNICAL FIELD

The present invention relates to a core-shell type polymeric particle having a phosphonic acid or phosphonic acid ester structure, a particle dispersion, a molded body, and a method for producing the particle.

BACKGROUND ART

A Polymeric particle is known to exhibit excellent dispersibility, and is used, for example, as a dispersant for paint, adhesives, and cosmetics. Among them, the core-shell type polymeric particle has attracted attention in recent years, and further it has been studied to select each kind of high-molecular-weight compound that forms a core (central part) and a shell (surface part) of a particle and to apply the high-molecular-weight compound to, for example, a medical application, a catalyst, a material for a battery, and a resin modifier.

As such core-shell type polymeric particle, for example, those in which poly(N-vinyl-2 pyrrolidone) is introduced as a shell into a core of polyhydroxypropyl methacrylate or a core of polyvinyl acetate, in order to improve stability in water are known (Non-Patent Literatures 1 and 2).

It has proposed the technique for imparting proton conductivity by sulfonation of core-shell type polymeric particle having a crosslinked structure using chlorosulfonic acid (Patent Literature 1).

In addition, when the core-shell type polymeric particle is used as, for example, the material for a battery and the resin modifier, flame retardance is required. Recently, further improvement of flame retardance has been required.

CITATION LIST

Patent Literature

Patent Literature 1: JP 5464935 B2

Non-Patent Literature

Non-Patent Literature 1: Soft Matter, 2007, 3, 1003-1013
Non-Patent Literature 2: Macromolecules, 2014, 47, 3461-3472.

SUMMARY OF INVENTION

Technical Problem

An object of the present invention is to provide a core-shell type polymeric particle which exhibits good dispersibility in an aqueous medium and has excellent flame retardance.

Solution to Problem

As a result of intensive studies, the present inventors found that a core-shell type polymeric particle having a copolymer having a repeating unit (a) derived from vinyl phosphonic acid or a vinyl phosphonic acid ester and a specific repeating unit (b) having a nitrogen-containing heterocycle in a side chain as a shell and having a hydrophobic polymer (c) as a core exhibits good dispersibility in an aqueous medium and has excellent flame retardance, and consequently completed the present invention.

That is, the present invention provides the following <1> to <10>.

<1> A core-shell type polymeric particle, including a shell including a copolymer having a repeating unit (a) derived from vinyl phosphonic acid or a vinyl phosphonic acid ester and a repeating unit (b) represented by the following formula (α), and a core including a hydrophobic polymer (c) (hereinafter, also referred to as "particle of the present invention").

(α)

[In the formula (α),
$R^a$ represents a hydrogen atom or a methyl group,
$R^b$ represents a single bond or a carbonyl group,
Ring $Q^1$ represents a substituted or unsubstituted 4 to 10 membered nitrogen-containing heterocycle.]

<2> The particle according to <1>, wherein the shell is composed of a copolymer having the repeating unit (a) and the repeating unit (b), and the core is composed of the hydrophobic polymer (c).

<3> The particle according to <1> or <2>, wherein the repeating unit (a) is represented by the following formula (1):

(1)

[In the formula (1), $R^1$ and $R^2$ each independently represent a hydrogen atom or a substituted or unsubstituted alkyl group having 1 to 6 carbon atoms, provided that when both $R^1$ and $R^2$ are alkyl groups, an oxygen atom and a phosphorus atom in the formula (1) may form a ring together.].

<4> The particle according to any one of <1> to <3>, wherein the ring $Q^1$ is a substituted or unsubstituted pyrrolidone ring.

<5> The particle according to any one of <1> to <4>, wherein the hydrophobic polymer (c) is derived from one or more of monomers selected from the group consisting of an olefin, a vinyl aromatic compound, (meth)acrylic acid, a (meth)acrylic acid derivative, (meth)acrylamide, a (meth)acrylamide derivative, and a vinyl ester of a saturated aliphatic carboxylic acid.

<6> The particle according to any one of <1> to <5>, wherein the particle has an average particle size of 100 to 2000 nm.

<7> The particle according to any one of <1> to <6>, which is obtained by an emulsion polymerization of the copolymer having the repeating unit (a) and the repeating unit (b) and a hydrophobic monomer in an aqueous medium.

<8> A particle dispersion in which the particle according to any one of <1> to <7> is dispersed (hereinafter, also referred to as "particle dispersion of the present invention").

<9> A molded body including the particle according to any one of <1> to <7> (hereinafter, also referred to as "molded body of the present invention").

<10> A method for producing a core-shell type polymeric particle, including a polymerization step for performing an emulsion polymerization of a copolymer having a repeating unit (a) derived from vinyl phosphonic acid or a vinyl phosphonic acid ester and a repeating unit (b) represented by the following formula (c) and a hydrophobic monomer in an aqueous medium (hereinafter, also referred to as "method for producing particle of the present invention"):

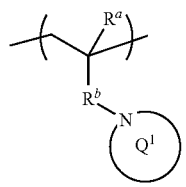

(α)

[In the formula (α),
$R^a$ represents a hydrogen atom or a methyl group,
$R^b$ represents a single bond or a carbonyl group,
Ring $Q^1$ represents a substituted or unsubstituted 4 to 10 membered nitrogen-containing heterocycle.]

Advantageous Effects of Invention

The particle of the present invention exhibits good dispersibility in an aqueous medium and has excellent flame retardance. In addition, it is possible to stably and efficiently produce the particle of the present invention under mild conditions.

Furthermore, according to the method for producing particle of the present invention, the core-shell type polymeric particle which exhibits good dispersibility in an aqueous medium and has excellent flame retardance can be stably and efficiently produced under mild conditions.

DESCRIPTION OF EMBODIMENTS

[Polymeric Particle]

Figure 1:
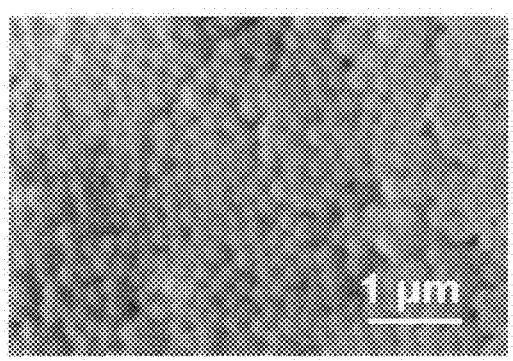
FIG. 1 is a view showing an SEM image of particle obtained in Example 1.

The particle of the present invention is a core-shell type polymeric particle, including a shell including a copolymer having a repeating unit (a) derived from vinyl phosphonic acid or a vinyl phosphonic acid ester and a repeating unit (b) represented by the formula (α) (hereinafter, also referred to as "copolymer (X)"), and a core including a hydrophobic polymer (c). First, the particle of the present invention is described in detail.

In the particle of the present invention, the shell is provided so as to cover the part or all of a surface of the core. As the particle of the present invention, those in which the content of the copolymer (X) is 90 to 100% by mass in the polymer constituting the shell and the content of the hydrophobic polymer (c) is 90 to 100% by mass in the polymer constituting the core are preferable, and those in which the shell is composed of the copolymer (X) and the core is composed of the hydrophobic polymer (c) are more preferable from the viewpoint of functionality such as dispersibility or flame retardance and ease of production.

(Repeating Unit (a))

The repeating unit (a) is a repeating unit derived from vinyl phosphonic acid or a vinyl phosphonic acid ester. By containing the repeating unit (a) in the polymer of the shell, excellent flame retardance is obtained. In addition, when the particle is added to the dispersion medium together with a metal compound, the dispersibility of the metal compound can be greatly improved.

The repeating unit (a) is preferably represented by the following formula (1) from the viewpoint of, for example, functionality and stability of the particle, and ease of production.

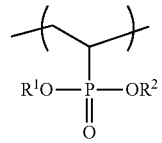

(1)

[In the formula (1), $R^1$ and $R^2$ each independently represent a hydrogen atom or a substituted or unsubstituted alkyl group having 1 to 6 carbon atoms, provided that when both $R^1$ and $R^2$ are alkyl groups, an oxygen atom and a phosphorus atom in the formula (1) may form a ring together.]

$R^1$ and $R^2$ in the formula (1) are preferably substituted or unsubstituted alkyl groups having 1 to 6 carbon atoms from the viewpoint of, for example, functionality, stability, and ease of production, of the particle. When $R^1$ and $R^2$ are each an alkyl group having 1 to 6 carbon atoms, the particle can be easily produced with a small number of steps, but is excellent in flame retardance and dispersibility in an aqueous medium.

In the formula (1), the number of carbon atoms of the alkyl group represented by $R^1$ and $R^2$ is preferably 1 to 5, more preferably 1 to 3, and particularly preferably 1 or 2.

The alkyl group may be linear or branched. Specific examples the alkyl group include a methyl group, an ethyl group, an n-propyl group, an isopropyl group, an n-butyl group, an isobutyl group, a tert-butyl group, an n-pentyl group, a 1-methylbutyl group, a 2-methylbutyl group, and an n-hexyl group.

The alkoxy group represented by $R^1$ and $R^2$ may or may not have a substituent. Examples of the substituent include halogen atoms such as a chlorine atom, a bromine atom, and a fluorine atom. The substitution position and the number of substitutions of the substituent are arbitrary, and when the alkoxy group has two or more substituents, the substituents may be the same or different. Examples of the ring that $R^1$ and $R^2$ may form together with the oxygen atom and the phosphorus atom in the formula (1) include a phosphonate alkanediyl ring having a total carbon number of 2 to 10 (preferably a total carbon number of 3 to 6) such as a phosphonic acid 1,2-ethanediyl ring, a phosphonic acid 2,3-dimethyl-2,3-butanediyl ring, a phosphonic acid 1,3-propanediyl ring, and a phosphonic acid 2,2-dimethyl-1,3-propanediyl ring.

Examples of the vinyl phosphonic acid ester among the monomers that give the repeating unit (a) include methyl vinylphosphonate, dimethyl vinylphosphonate, ethyl vinylphosphonate, diethyl vinylphosphonate, vinyl phosphonic acid bis(2-chloroethyl) ester, di-n-propyl vinylphosphonate, vinyl phosphonic acid diisopropyl ester, ethenylphosphonic acid 2,3-dimethyl-2,3-butanediyl, ethenylphosphonic acid 1,3-propanediyl ester, and ethenylphosphonic acid 2,2-dimethyl-1,3-propanediyl ester. Among these, one kind may be used alone, or two or more kinds may be used in combination.

Among the monomers that give the repeating unit (a), vinyl phosphonic acid and dimethyl vinylphosphonate are preferable, and dimethyl vinylphosphonate is particularly preferable, from the viewpoint of, for example, dispersibility in an aqueous medium, and ease of production.

The content of the repeating unit (a) is preferably 10 to 90 mol %, more preferably 20 to 80 mol %, and particularly preferably 30 to 70 mol % in all the repeating units of the copolymer (X) from the viewpoint of, for example, flame retardance, and dispersibility in an aqueous medium.

The content of each repeating unit contained in the copolymer (X) refers to a value measured by $^1$H NMR or the like.

(Repeating Unit (b))

The repeating unit (b) is represented by the formula ($\alpha$). By containing the repeating unit (b) in the polymer of the shell, dispersibility in an aqueous medium is improved.

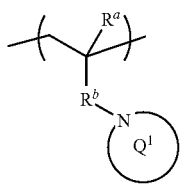
($\alpha$)

[In the formula ($\alpha$),
$R^a$ represents a hydrogen atom or a methyl group,
$R^b$ represents a single bond or a carbonyl group,
Ring $Q^1$ represents a substituted or unsubstituted 4 to 10 membered nitrogen-containing heterocycle.]

The nitrogen-containing heterocycle represented by ring $Q^1$ is a 4 to 10 membered ring, and is preferably a 5 to 7 membered ring, more preferably a 5 to 6 membered ring, and particularly preferably a 5 membered ring.

The nitrogen-containing heterocycle may or may not have a substituent. Examples of the substituent include halogen atoms such as a chlorine atom, a bromine atom, and a fluorine atom; a hydroxyl group; an alkyl group having about 1 to 3 carbon atoms, such as a methyl group, an ethyl group, an n-propyl group, or an isopropyl group; a hydroxyalkyl group having about 1 to 3 carbon atoms such as a hydroxymethyl group, a hydroxyethyl group, a hydroxy n-propyl group, or a hydroxyisopropyl group. The substitution position and the number of substitutions of the substituent are arbitrary, and when the alkoxy group has two or more substituents, the substituents may be the same or different.

Examples of the ring $Q^1$ include a substituted or unsubstituted pyrrolidone ring, a substituted or unsubstituted morpholine ring, a substituted or unsubstituted piperidine ring, a substituted or unsubstituted pyrrolidine ring, a substituted or unsubstituted piperidone ring, a substituted or unsubstituted piperazine ring, and a substituted or unsubstituted caprolactam ring.

Among them, from the viewpoint of, for example, flame retardance, and dispersibility in an aqueous medium, the substituted or unsubstituted pyrrolidone ring, the substituted or unsubstituted morpholine ring, the substituted or unsubstituted piperidine ring, the substituted or unsubstituted pyrrolidine ring, the substituted or unsubstituted piperidone ring, and the substituted or unsubstituted piperazine ring are preferable, the substituted or unsubstituted pyrrolidone ring is more preferable, and the substituted or unsubstituted 2-pyrrolidone ring is particularly preferable.

Examples of the monomer that gives the repeating unit (b) include N-vinyl-2-pyrrolidone, N-(meth)acryloylmorpholine, N-(meth)acryloylpiperidine, N-(meth)acryloylpyrrolidine, 1-(meth)acryloylpiperidine-2-one, 1-(meth)acryloylpyrrolidine-2-methanol, 1-(meth)acryloyl-2-pyrrolidone, and 1-(meth)acryloyl-4-methylpiperazine. Among these, one kind may be used alone, or two or more kinds may be used in combination.

The content of the repeating unit (b) is preferably 10 to 90 mol %, more preferably 20 to 80 mol %, and particularly preferably 30 to 70 mol % in all the repeating units of the copolymer (X) from the viewpoint of, for example, flame retardance, and dispersibility in an aqueous medium.

The range of the molar ratio of the repeating unit (a) to the repeating unit (b) [(a):(b)] in the copolymer (X) is preferably 10:90 to 90:10, more preferably 20:80 to 80:20, and particularly preferably 30:70 to 70:30, from the viewpoint of, for example, flame retardance, and dispersibility in an aqueous medium.

The number average molecular weight of the copolymer (X) is preferably 1000 to 50000, and more preferably 2000 to 25000.

The molecular weight distribution is preferably 1.0 to 5.0, more preferably 1.1 to 4.0.

The number average molecular weight and molecular weight distribution in the present description refer to values measured by GPC or the like.

The repeating unit (a) of the shell may contain one or more among the repeating units derived from vinyl phosphonic acid or a vinyl phosphonic acid ester. The repeating unit (b) may contain one or more among repeating units represented by the formula ($\alpha$).

The sequence of the repeating units of the copolymer (X) in the shell is not particularly limited, and examples thereof include a block copolymer, a random copolymer, and an alternating copolymer.

(Hydrophobic Polymer (c))

The hydrophobic polymer (c) may be a polymer having low affinity with water.

As the monomer that provides the hydrophobic polymer (c), a hydrophobic monomer having radical polymerizability is preferable, and a hydrophobic monofunctional polymerizable compound is more preferable.

Examples of the monomer include an olefin, a vinyl aromatic compound, (meth)acrylic acid, a (meth)acrylic acid derivative, (meth)acrylamide, a (meth)acrylamide derivative, and a vinyl ester of a saturated aliphatic carboxylic acid. Among these monomers, one or more selected from the group consisting of the vinyl aromatic compound, the (meth)acrylic acid derivative, the (meth)acrylamide derivative, and the vinyl ester of the saturated aliphatic carboxylic acid are preferable, and from the viewpoint of, for example, dispersibility in an aqueous medium, one or more selected from the group consisting of the vinyl aromatic compound, the (meth)acrylic acid derivative, and the vinyl ester of the saturated aliphatic carboxylic acid are more preferable, one or more selected from the group consisting of the vinyl aromatic compound and the vinyl ester of the saturated aliphatic carboxylic acid are still more preferable, and the vinyl aromatic compound is particularly preferable. When the hydrophobic polymer (c) is derived from the vinyl aromatic compound, dispersibility in an aqueous medium is particularly excellent.

The hydrophobic polymer (c) may be one kind of a homopolymer selected from the monomers or a copolymer containing more kinds of the monomers. When the hydrophobic polymer (c) is the copolymer, the copolymer may be any of a block copolymer, a random copolymer, and an alternating copolymer.

The olefin is preferably an olefin having 6 to 14 carbon atoms. The olefin may be a chain olefin or a cyclic olefin. Specific examples of the olefin include hexene, octene, cyclohexene, cyclooctene, and vinylcyclohexene.

The vinyl aromatic compound is preferably a compound represented by the following formula (2).

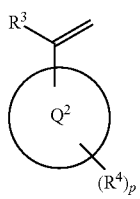

(2)

[In the formula (2), ring $Q^2$ represents an aromatic ring, $R^3$ represents a hydrogen atom or a methyl group, $R^4$ represents an alkyl group, an alkoxy group, a hydroxyl group or a halogen atom, and variable p is an integer of 0 to 4.]

In the formula (2), the ring $Q^2$ is preferably a benzene ring, a naphthalene ring, or a pyridine ring, more preferably the benzene ring or the naphthalene ring, and particularly preferably the benzene ring.

In the formula (2), the number of carbon atoms of the alkyl group represented by $R^4$ is preferably 1 to 4, and more preferably 1 or 2. The alkyl group may be linear or branched, and specific examples thereof include a methyl group, an ethyl group, an n-propyl group, an isopropyl group, an n-butyl group, an isobutyl group, and a tert-butyl group.

The number of carbon atoms of the alkoxy group represented by $R^4$ is preferably 1 to 4, and more preferably 1 or 2. The alkoxy group may be linear or branched, and specific examples thereof include a methoxy group and an ethoxy group.

Examples of the halogen atom represented by $R^4$ include a fluorine atom, a chlorine atom, and a bromine atom.

The variable p is an integer of 0 to 4, and is preferably 0 or 1. When the variable p is an integer of 2 to 4, p $R^4$s may be the same as or different from each other.

Specific examples of the vinyl aromatic compound include styrene, α-methylstyrene, t-butylstyrene (o, m, and p form), t-butoxystyrene (o, m, and p form), hydroxystyrene (o, m, and p form), and vinylnaphthalene.

As the (meth)acrylic acid derivative, a (meth)acrylic acid ester is preferable, an alkyl (meth)acrylate is more preferable, and a compound represented by the following formula (3) is particularly preferable.

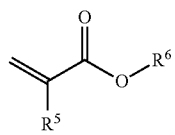

(3)

[In the formula (3), $R^6$ represents a hydrogen atom or a methyl group, and $R^6$ represents a linear or branched alkyl group having 1 to 10 carbon atoms.]

The number of carbon atoms of the alkyl group represented by $R^6$ is preferably 1 to 8, more preferably 1 to 6, and particularly preferably 1 to 4. Specific examples of the alkyl group include a methyl group, an ethyl group, an n-propyl group, an isopropyl group, an n-butyl group, an isobutyl group, a tert-butyl group, and a 2-ethylhexyl group.

Specific examples of the (meth)acrylic acid derivative include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, and 2-ethylhexyl (meth)acrylate.

As the (meth)acrylamide derivative, N-alkyl (meth)acrylamide and N,N-dialkyl(meth)acrylamide are preferable, and N—$C_{1-10}$alkyl (meth) acrylamide and N,N-di$C_{1-10}$alkyl (meth)acrylamide are more preferable.

Examples of the alkyl group in N—$C_{1-10}$alkyl (meth) acrylamide and N,N-di$C_{1-10}$alkyl (meth) acrylamide include the same group as the alkyl group represented by $R^6$.

Specific examples of the (meth)acrylamide derivative include N-methyl(meth)acrylamide, N-ethyl(meth)acrylamide, N-isopropyl(meth)acrylamide, N,N-dimethyl(meth) acrylamide, and N,N-diethyl(meth)acrylamide.

The vinyl ester of the saturated aliphatic carboxylic acid is preferably a compound represented by the following formula (4).

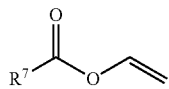

(4)

[In the formula (4), $R^7$ represents a linear or branched alkyl group having 1 to 14 carbon atoms.]

The number of carbon atoms of the alkyl group represented by $R^7$ has preferably 1 to 12 carbon atoms, more preferably 1 to 8 carbon atoms, still more preferably 1 to 4 carbon atoms, and particularly preferably 1 or 2 carbon atoms. Specific examples of the alkyl group include a methyl group, an ethyl group, an n-propyl group, an isopropyl group, an n-butyl group, an isobutyl group, a tert-butyl group, a pentyl group, a hexyl group, a heptyl group, an octyl group, a 2-ethylhexyl group, a nonyl group, a decyl group, an undecyl group, and a dodecyl group.

Specific examples of the vinyl ester of a saturated aliphatic carboxylic acid include vinyl acetate, vinyl propionate, vinyl hexanoate, and vinyl laurate.

The number average molecular weight of the hydrophobic polymer (c) is preferably 2500 to 250000, and more preferably 8500 to 130000. The molecular weight distribution is preferably 1.0 to 5.0, more preferably 1.1 to 3.5.

The copolymer (X) and the hydrophobic polymer (c) contained in the particle of the present invention are preferably linear polymers. The linear polymer refers to a polymer having a linear molecular structure, and is a concept including a polymer having a structure composed of a long linear main chain and a relatively short side chain bonded thereto.

The particle of the present invention is preferably those in which the part or all of the copolymer (X) and the hydrophobic polymer (c) are chemically bonded, and more preferably those in which the terminal of the copolymer (X) and the terminal of the hydrophobic polymer (c) are chemically bonded.

The average particle size of the particle of the present invention is preferably 100 nm or more, more preferably 200 nm or more, still more preferably 250 nm or more, and particularly preferably 300 nm or more from the viewpoint of the expression of chemical characteristics of the core, and is preferably 2000 nm or less, more preferably 1500 nm or less, still more preferably 750 nm or less, and particularly preferably 500 nm or less from the viewpoint of dispersion stability over time. The specific range is preferably 100 nm or more and 2000 nm or less, more preferably 200 nm or more and 1500 nm or less, still more preferably 250 nm or more and 750 nm or less, particularly preferably 300 nm or more and 500 nm or less.

The particle size distribution (PDI) is preferably 0.005 or more, more preferably 0.01 or more, and particularly preferably 0.02 or more, and from the viewpoint of dispersion stability over time, the particle size distribution is preferably 0.9 or less, more preferably 0.0 or less, and particularly preferably 0.7 or less. The specific range is preferably 0.005 or more and 0.9 or less, more preferably 0.01 or more and 0.8 or less, and particularly preferably 0.02 or more and 0.7 or less.

The coefficient of variation (CV) is preferably 0.1% or more, more preferably 0.5% or more, and particularly preferably 1% or more, and from the viewpoint of dispersion stability over time, the coefficient of variation (CV) is preferably 15% or less, more preferably 10% or less, and particularly preferably 9% or less. The specific range is preferably 0.1% or more and 15% or less, more preferably 0.5% or more and 10% or less, and particularly preferably 1% or more and 9% or less.

In the present specification, the average particle size means a volume average particle size measured by a dynamic light scattering method, and the average particle size, particle size distribution (PDI), and coefficient of variation (CV) can be specifically measured by the method described in Examples described later.

The content of the copolymer (X) is preferably 5% by mass or more, more preferably 10% by mass or more, and particularly preferably 15% by mass or more, and is preferably 95% by mass or less, more preferably 90% by mass or less, and particularly preferably 85% by mass or less, based on the total mass of the particle of the present invention. The specific range is preferably 5% by mass or more and 95% by mass or less, more preferably 10% by mass or more and 90% by mass or less, and particularly preferably 15% by mass or more and 85% by mass or less.

The content of the hydrophobic polymer (c) is preferably 5% by mass or more, more preferably 10% by mass or more, and particularly preferably 15% by mass or more, and is preferably 95% by mass or less, more preferably 90% by mass or less, and particularly preferably 85% by mass or less, based on the total mass of the particle of the present invention. The specific range is preferably 5% by mass or more and 95% by mass or less, more preferably 10% by mass or more and 90% by mass or less, and particularly preferably 15% by mass or more and 85% by mass or less.

The content mass ratio of the copolymer (X) and the hydrophobic polymer (c) [(X):(c)] may be appropriately selected according to the desired particle size and use, and from the viewpoint of dispersibility, the content mass ratio is preferably in the range of 10:1 to 1:10, more preferably in the range of 8:1 to 1:8, and particularly preferably in the range of 5:1 to 1:5.

The contents of the copolymer (X) and the hydrophobic polymer (c) can be measured by centrifuging a particle-containing solution at a rotation speed of about 3000 rpm, and then subjecting a non-particle component present in the supernatant to 1H NMR analysis.

The particle of the present invention exhibits good dispersibility in an aqueous medium and has excellent flame retardance. In addition, it is also excellent in performance of dispersing the metal compound in a dispersion medium and proton conductivity.

Therefore, the particle of the present invention is useful as, for example, a carrier for supporting a catalyst, a flame-resistant material, a dispersant of a metal compound, and an electrolyte membrane material.

[Method for Producing Particle]

Next, a method for producing the particle of the present invention is described in detail.

The method for producing core-shell type polymeric particle of the present invention includes a polymerization step of performing emulsion polymerization of the copolymer (X) and the hydrophobic monomer in an aqueous medium. According to the method for producing the particle of the present invention, the particle of the present invention can be produced stably and efficiently under mild conditions.

Specific examples of a method of obtaining the copolymer (X) include a method of performing a polymerization reaction by containing a monomer to give the repeating unit (a), a monomer to give the repeating unit (b), an aqueous medium, and a radical polymerization initiator in a container.

Examples of the monomer that gives the repeating unit (a) include the same monomers as those mentioned as vinyl phosphonic acid and vinyl phosphonic acid ester. Among them, vinyl phosphonic acid ester is preferable from the viewpoint of ease of progress of synthesis reaction of the copolymer (X).

Examples of the monomer that gives the repeating unit (b) include the same monomers as those mentioned as the monomers that give the repeating unit (b).

The amount of the monomer that gives the repeating unit (b) used is preferably 10 parts by mol or more, more preferably 20 parts by mol or more, and particularly preferably 30 parts by mol or more, and is preferably 90 parts by mol or less, more preferably 80 parts by mol or less, and particularly preferably 70 parts by mol or less, based on total 100 parts by mol of the monomer that gives the repeating unit (a) and the monomer that gives the repeating unit (b). As the specific range, 10 parts by mol or more and 90 parts by mol or less are preferable, 20 parts by mol or more and 80 parts by mol or less are more preferable, and 30 parts by mol or more and 70 parts by mol or less are particularly preferable.

Subsequently, specific examples of the method for obtaining the particle of the present invention by emulsion polymerization include a method of performing a polymerization reaction by containing the copolymer (X), the hydrophobic monomer, the aqueous medium, and the radical polymerization initiator in a container. In the method of using the radical polymerization initiator, a hydrogen atom or the like at the terminal of the copolymer (X) is pulled out by the radical polymerization initiator to generate an active site, and the hydrophobic polymer (c) is generated from the active site.

The amount of the copolymer (X) used is preferably 5 parts by mass or more, more preferably 10 parts by mass or more, and particularly preferably 15 parts by mass or more, and is preferably 95 parts by mass or less, more preferably 90 parts by mass or less, and particularly preferably 85 parts by mass or less, based on total 100 parts by mass of the copolymer (X) and the hydrophobic monomer. The specific range is preferably 5 parts by mass or more and 95 parts by mass or less, more preferably 10 parts by mass or more and 90 parts by mass or less, and particularly preferably 15 parts by mass or more and 85 parts by mass or less.

Examples of the hydrophobic monomer include the same monomers as those mentioned as the monomers that give the hydrophobic polymer (c).

The amount of the hydrophobic monomer used is preferably 5 parts by mass or more, more preferably 10 parts by mass or more, still more preferably 15 parts by mass or more, and particularly preferably 20 parts by mass or more, and is preferably 95 parts by mass or less, more preferably 90 parts by mass or less, and particularly preferably 85 parts by mass or less, based on total 100 parts by mass of the copolymer (X) and the hydrophobic monomer. As a specific range, 5 parts by mass or more and 95 parts by mass or less are preferable, 10 parts by mass or more and 90 parts by mass or less are more preferable, 15 parts by mass or more and 85 parts by mass or less are still more preferable, and 20 parts by mass or more and 85 parts by mass or less are particularly preferable.

The total amount of the copolymer (X) and the hydrophobic monomer used is preferably 90 to 100% by mass, more preferably 95 to 100% by mass, and particularly preferably 99 to 100% by mass, based on the total amount of the polymerizable compound (The polymerizable compound contains a polymer and a non-polymer).

The radical polymerization initiator that can be used for the synthesis of the copolymer (X) and the emulsion polymerization of the copolymer (X) and the hydrophobic monomer is not particularly limited. However, a water-soluble polymerization initiator that generates a radical by heat is preferable. Examples of the radical polymerization initiator include azo polymerization initiators such as 2,2'-azobis[2-(2-imidazoline-2-yl)propane]dihydrochloride, 2,2'-azobis(2-methylpropionamidine)dihydrochloride, 2,2'-azobis[N-(2-carboxyethyl)-2-methylpropionamidine]tetrahydrate, 2,2-azobis[2-(2-imidazoline-2-yl)propane], 2,2'-azobis[2-methyl-N-(2-hydroxyethyl)propionamide], and 4,4'-azobis (4-cyanovaleric acid); organic peroxides such as cumene hydroperoxide, di-t-butyl peroxide, t-butyl hydroperoxide, and t-butyl peroxyacetate. As for the radical polymerization initiator, one kind may be used alone or two or more kinds may be used in combination.

In the synthesis of the copolymer (X), the amount of the radical polymerization initiator used is preferably 0.005 to 5 parts by mass, more preferably 0.01 to 3 parts by mass, and still more preferably 0.05 to 1 parts by mass, based on 100 parts by mass of the total of the monomer that gives the repeating unit (a) and the monomer that gives the repeating unit (b).

In the emulsion polymerization of the copolymer (X) and the hydrophobic monomer, the amount used is preferably 0.01 to 50 parts by mass, more preferably 0.1 to 10 parts by mass, still more preferably 0.5 to 5 parts by mass, and particularly preferably 0.5 to 2.5 parts by mass, based on 100 parts by mass of the hydrophobic monomer. According to the method for producing particle of the present invention, the particle of the present invention can be efficiently obtained even when the radical polymerization initiator is in such a low concentration.

Examples of the aqueous medium that can be used for the synthesis of the copolymer (X) and the emulsion polymerization of the copolymer (X) and the hydrophobic monomer include water; monohydric alcohol solvents such as methanol, ethanol, or isopropanol; polyhydric alcohol solvents such as ethylene glycol; amide solvents such as N,N-dimethylformamide, and among these, one kind may be used alone, or two or more kinds may be used in combination. As for the mixed solvent, the amount of water is preferably 50% (v/v) or more based on the total volume of the aqueous medium.

Among these aqueous media, water, a mixed solvent of water and one or more selected from the group consisting of the monohydric alcohol solvent, the polyhydric alcohol solvent, and the amide solvent are preferable, and water is more preferable.

In the synthesis of the copolymer (X), the amount of the aqueous medium to be used is preferably 10 to 500 parts by mass, and more preferably 20 to 200 parts by mass, based on total 100 parts by mass of the monomer that gives the repeating unit (a) and the monomer that gives the repeating unit (b).

In the emulsion polymerization of the copolymer (X) and the hydrophobic monomer, the amount used can be selected as appropriate according to the desired particle size and application and is preferably 100 to 3000 parts by mass, and more preferably 200 to 2500 parts by mass, based on the total 100 parts by mass of the copolymer (X) and the hydrophobic monomer.

In the synthesis of the copolymer (X), the ratio of the components used is preferably 25 to 80 parts by mass in total of the monomer that gives the repeating unit (a) and the monomer that gives the repeating unit (b), 0.01 to 1 part by mass of the radical polymerization initiator, and 15 to 70 parts by mass of the aqueous medium in 100 parts by mass of the polymerization reaction solution.

In the emulsion polymerization of the copolymer (X) and the hydrophobic monomer, the rate of the components used is preferably 5 to 30 parts by mass in total of the copolymer (X) and the hydrophobic monomer, 0.1 to 3 parts by mass of the radical polymerization initiator, and 70 to 90 parts by mass of the aqueous medium in 100 parts by mass of the polymerization reaction solution.

The reaction temperature in each polymerization step is preferably 20 to 100° C., and more preferably 40 to 80° C.

The reaction time in each polymerization step varies depending on the kind, amount, and reaction temperature of a reagent is preferably 2 to 50 hours, and more preferably 3 to 30 hours.

The emulsion polymerization of the copolymer (X) and the hydrophobic monomer is preferably performed by stirring. The stirring rate is preferably as high as possible because a large shear force is applied to the polymerization reaction solution. For example, when stirring the solution with a stirrer in a Schlenk tube, the stirring rate is preferably 400 rpm or more.

Among the particle of the present invention, those having a repeating unit derived from vinyl phosphonic acid as the repeating unit (a) can be obtained, for example, by a method in which particle having a repeating unit derived from vinyl phosphonic acid ester as the repeating unit (a) are obtained by the emulsion polymerization described above and then hydrolyzed.

Furthermore, according to the method for producing particle of the present invention, the core-shell type polymeric particle which exhibits good dispersibility in an aqueous medium and has excellent flame retardance can be stably and efficiently produced under mild conditions.

[Particle Dispersion]

The particle dispersion of the present invention is one in which the particle of the present invention is dispersed.

The dispersion medium is preferably the same as the aqueous medium used in the polymerization step. The concentration of the particle is preferably 0.01 to 30% by mass, more preferably 1 to 25% by mass, and particularly preferably 5 to 20% by mass, based on the total amount of the particle dispersion.

[Molded Body]

The molded body of the present invention contains the particle of the present invention.

The form of the molded body of the present invention is not particularly limited, and examples thereof include a film, a sheet, and a plate.

The molded body of the present invention can be produced, for example, by a method of pouring the particle dispersion of the present invention into a mold and removing the dispersion medium by drying or the like, and a method using a spin coater.

EXAMPLES

Hereinafter, the present invention is described in detail with reference to examples, and the present invention is not limited to these examples. The measurement in the following Examples was performed according to the following measurement method.

<$^1$H NMR Measurement>

$^1$H NMR measurement was performed using JNM-ECX500II manufactured by JEOL Ltd. In the composition calculation of the copolymer of dimethyl vinylphosphonate and N-vinyl-2-pyrrolidone, the copolymer was dissolved in heavy water and measured. On the other hand, when the particle is subjected to the $^1$H NMR measurement, after the particle was centrifuged at 3000 rpm for 30 minutes to obtain sediment, the sediment was dispersed in deuterated chloroform or heavy water to make a sample, and the sample was measured (Example 1).

<GPC Analysis>

Mn and Mw/Mn of the copolymer of dimethyl vinylphosphonate and N-vinyl-2-pyrrolidone were measured by GPC under the following conditions. The measured value is in terms of polystyrene.

Measuring device: a series of devices including Degaster SD-8022 (manufactured by GL Sciences Inc.), CO-8020, CCPM-II pump, and RI-8020 (manufactured by Tosoh Corporation)

Column: One TSKgel guardcolumn $H_{HR}$-L (manufactured by Tosoh Corporation) and two TSKgel G-$MH_{HR}$-M (manufactured by Tosoh Corporation) were combined and used.

Mobile phase: N,N-dimethylformamide to which 10 mmol/L of lithium bromide is added <Measurement of Particle Size by Dynamic Light Scattering (DLS)>

Particle size measurement by DLS was performed at a scattering angle of 1730 using Zetasizer Nano-ZSP manufactured by Malvern Instruments Ltd. The measurement data was analyzed by a cumulant method in Zeta Software Ver. 7.02, and the particle size ($D_h$) and the particle size distribution (PDI) were calculated. In addition, the obtained average particle size was a result obtained by 9 or more measurements, and the coefficient of variation (CV) was calculated from the standard deviation of the particle size measurement results.

<Scanning Electron Microscope (SEM) Measurement>

SEM measurement was performed using S-2600H manufactured by Hitachi High-Technologies Corporation by charging a sample (aqueous dispersion of particle) into an aluminum sample stage to which a carbon tape was adhered, air-drying the sample sufficiently, and then depositing gold on the sample.

<Transmission Electron Microscope (TEM) Measurement>

TEM measurement was performed at an acceleration voltage of 200 kV using JEM2100 (with a Gatan ORIUS SC200D CCD camera) manufactured by JEOL Ltd. In addition, 5 µL of an aqueous dispersion of particle was dropped onto a carbon-coated copper grid (ELS-C10 manufactured by Okenshoji Co., Ltd) whose surface was subjected to a hydrophilic treatment by glow discharge, an excess dispersion was removed, then the resulting grid was negatively stained with an EM stain (Nisshin-EM Co., Ltd.), and dried, and the dried grid was used as a sample for measurement.

Synthesis Example 1 Synthesis of Copolymer of Dimethyl Vinylphosphonate and N-Vinyl-2-Pyrrolidone A stirrer, dimethyl vinylphosphonate (hereinafter, referred to as "P1M".) and N-vinyl-2-pyrrolidone (hereinafter, referred to as "NVP".) as monomers were added to a test tube in three molar ratios as described later, 0.020 g (0.074 mmol, 0.1 mol % based on the total monomers) of 2,2'-azobis(2-methylpropionamidine)dihydrochloride ("V-50" manufactured by FUJIFILM Wako Pure Chemical Corporation, hereinafter referred to as "AIBA".) was added, water as a polymerization solvent in an amount such that the monomer concentration (total concentration of P1M and NVP based on the total mass of P1M, NVP, and the solvent) was 50% by mass was further added, and the resulting mixture was well dissolved.

Three molar ratios of charged P1M and NVP were P1M NVP in: 70:30 (Synthesis Example 1, No. 1), 50:50 (Synthesis Example 1, No. 2), and 30:70 (Synthesis Example 1, No. 3). The amounts of P1M and NVP used at this time were 7.024 g (51.6 mmol)/2.459 g (22.1 mmol) for No. 1, 5.017 g (36.9 mmol)/4.098 g (36.9 mmol) for No. 2, and 3.010 g (22.1 mmol)/5.737 g (51.6 mmol) for No. 3. At this time, 9.483 g, 9.115 g, and 8.727 g of water were added, respectively.

Then, freeze-degassing was performed 3 times, the test tube was then sealed, and a polymerization reaction was started in an oil bath at 60° C. After 24 hours from the start of the reaction, the polymerization was terminated by cooling and exposure to air, and $^1$H NMR analysis and GPC analysis were performed. The results are shown in Table 1.

TABLE 1

| No. | Charge ratio of monomer (molar ratio) | | Mn | Mw/Mn | Monomer inversion rate (%) | Copolymer composition (mol %) | |
|-----|------|------|-------|-------|-----|------|------|
|     | P1M  | NVP  |       |       |     | P1M  | NVP  |
| 1   | 70   | 30   | 4600  | 2.77  | 73  | 68.2 | 31.8 |
| 2   | 50   | 50   | 3700  | 3.18  | 99  | 59.7 | 40.3 |
| 3   | 30   | 70   | 11800 | 3.73  | 100 | 36.0 | 64.0 |

<Example 1 Production of Core-Shell Type Polymeric Particle Having Core Including Polystyrene and Shell Including Copolymer of Dimethyl Vinylphosphonate and N-Vinyl-2-Pyrrolidone>

A stirrer, 0.05 g of the copolymer (No. 2) of dimethyl vinyl phosphonate and N-vinyl-2-pyrrolidone (hereinafter, referred to as "P(P1M-NVP)") obtained in Synthesis Example 1, 0.200 g (1.92 mmol) of styrene (hereinafter, referred to as "St".), 4.750 g (264 mmol) of ion-exchanged water, and 0.002 g (0.007 mmol, 1 part by mass based on 100 parts by mass of a styrene monomer) of AIBA was added to a Schlenk tube. Next, freeze-degassing was performed 3 times, and then the mixture was stirred while being heated at 60° C. and 600 rpm for 24 hours. After the polymerization, air was introduced into the Schlenk tube, and the polymerization was terminated by cooling to obtain core-shell type polymeric particle having a core including polystyrene and a shell including P(P1M-NVP) in water.

The particle obtained by the particle size measurement using DLS had a particle size ($D_h$) of 355 nm, a particle size distribution (PDI) of 0.06, and a coefficient of variation (CV) of 3.1%. A SEM image of the obtained particle is shown in FIG. 1.

Figure 2:
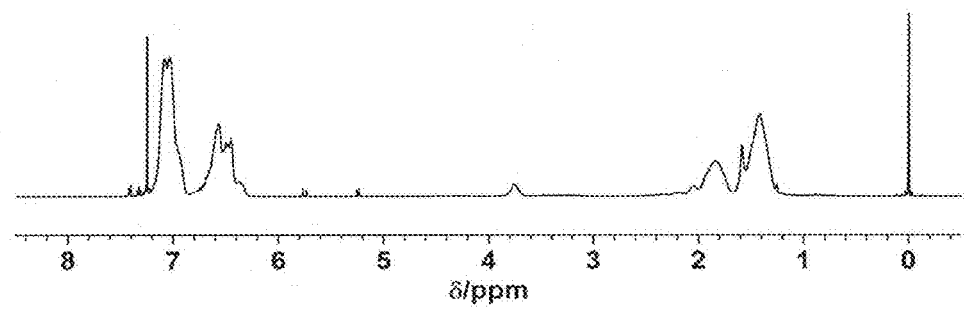
FIG. 2 is a view showing a $^1$H NMR spectrum of the particle obtained in Example 1 in deuterated chloroform.
Figure 3:
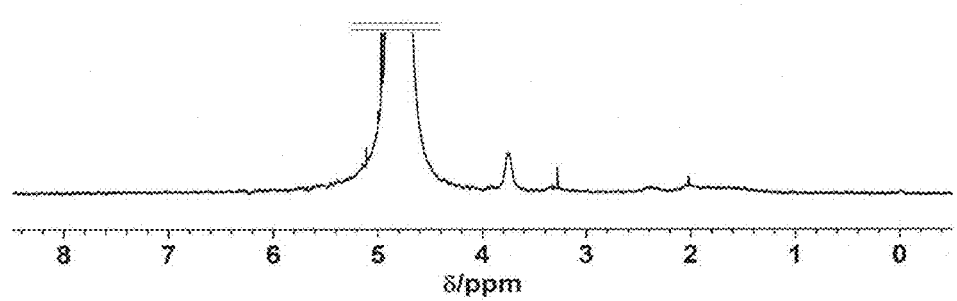
FIG. 3 is a view showing a $^1$H NMR spectrum of the particle obtained in Example 1 in heavy water.

$^1$H NMR spectra of the particle obtained in Example 1 in deuterated chloroform and heavy water are shown in FIGS. 2 and 3, respectively. In deuterated chloroform (FIG. 2), a signal derived from the methyl group of the P1M unit in P(P1M-NVP) was observed around 3.8 ppm, and a signal derived from the benzene ring of polystyrene was observed around 6.2 to 7.2 ppm. Thus, the presence of P(P1M-NVP) and polystyrene in the particle was observed in deuterated chloroform. Meanwhile, in heavy water (FIG. 3), the signal derived from the benzene ring of polystyrene was not observed, and only the signal derived from P(P1M-NVP) was observed around 4.2 ppm. Since NMR signal is affected by the mobility of nucleus, only signal derived from P(P1M-NVP) with good mobility was observed in heavy water, and polystyrene with poor mobility was not observed. From the result and the SEM image (FIG. 1), it found that the particle obtained in Example 1 had a core-shell structure in which polystyrene was used as a core and P(P1M-NVP) was used as a shell in water.

Example 2

The core-shell type polymeric particle was synthesized by the same procedure as in Example 1 except that the kind of P(P1M-NVP) was changed to No. 1 (P1M=68.2 mol %, NVP=31.8 mol %) in Table 1.

Figure 4:
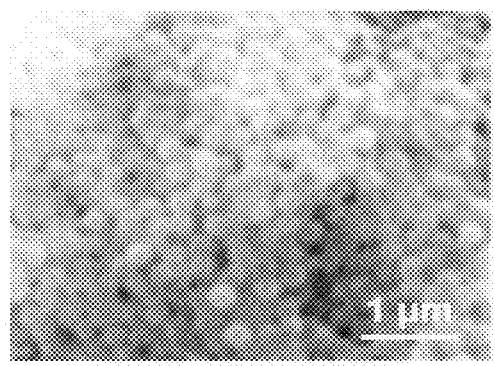
FIG. 4 is a view showing an SEM image of particle obtained in Example 2.

The particle obtained by the particle size measurement using DLS had a particle size ($D_h$) of 348 nm, a particle size distribution (PDI) of 0.07, and a coefficient of variation (CV) of 3.1%. A SEM image of the obtained particle is shown in FIG. 4.

Example 3

The core-shell type polymeric particle was synthesized by the same procedure as in Example 1 except that the kind of P(P1M-NVP) was changed to No. 3 (P1M=36.0 mol %, NVP=64.0 mol %) in Table 1.

Figure 5:
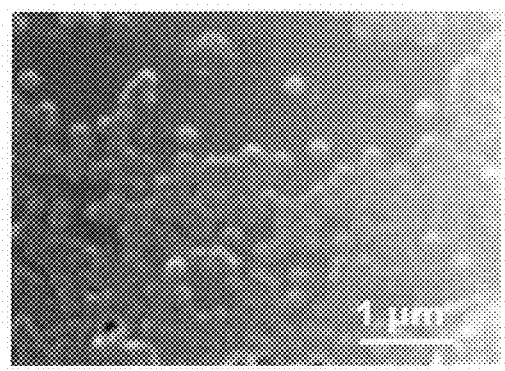
FIG. 5 is a view showing an SEM image of particle obtained in Example 3.

The particle obtained by the particle size measurement using DLS had a particle size ($D_h$) of 345 nm, a particle size distribution (PDI) of 0.12, and a coefficient of variation (CV) of 0.6%. A SEM image of the obtained particle is shown in FIG. 5.

Example 4-1 to Example 4-4

The core-shell type polymeric particle was synthesized by the same procedure as in Example 1 except that the amount of St used was changed to the amount shown in Table 2 and the amount of ion-exchanged water used was also changed accordingly. The results are shown in Table 2.

TABLE 2

|  | Mass ratio of P(P1M-NVP) and St | | St (g) | Water (g) | $D_h$ (nm) | PDI | CV (%) |
|---|---|---|---|---|---|---|---|
|  | P (P1M-NVP) | St |  |  |  |  |  |
| Example 4-1 | 1 | 1.3 | 0.065 | 2.185 | 301 | 0.09 | 1.3 |
| Example 4-2 | 1 | 2 | 0.100 | 2.850 | 328 | 0.09 | 0.6 |
| Example 1   | 1 | 4 | 0.200 | 4.750 | 355 | 0.06 | 3.1 |
| Example 4-3 | 1 | 6 | 0.300 | 6.650 | 380 | 0.11 | 3.7 |
| Example 4-4 | 1 | 8 | 0.400 | 8.550 | 384 | 0.10 | 3.9 |

Example 5 Production of Core-Shell Type Polymeric Particle Having a Core Including Poly(Ethyl Acrylate) and a Shell Including P(P1M-NVP)

The core-shell type polymeric particle was synthesized by the same procedure as in Example 1 except that styrene was changed to 0.200 g (2.0 mmol) of ethyl acrylate.

Figure 6:
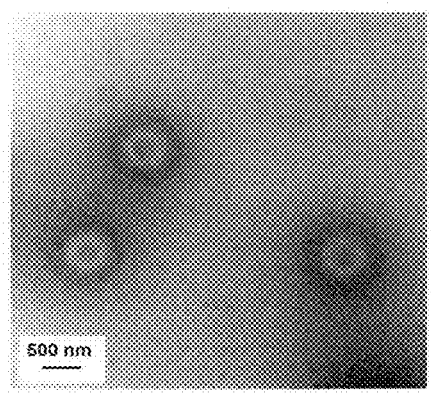
FIG. 6 is a view showing a TEM image of particle obtained in Example 5.

The particle obtained by the particle size measurement using DLS had a particle size ($D_h$) of 645 nm, a particle size distribution (PDI) of 0.02, and a coefficient of variation (CV) of 3.4%. A TEM image of the obtained particle is shown in FIG. 6.

Example 6 Production of Core-Shell Type Polymeric Particle Having Core Including Poly(Methyl Methacrylate) and Shell Including P(P1M-NVP)

The core-shell type polymeric particle was synthesized by the same procedure as in Example 1 except that styrene was changed to 0.200 g (2.0 mmol) of methyl methacrylate.

Figure 7:
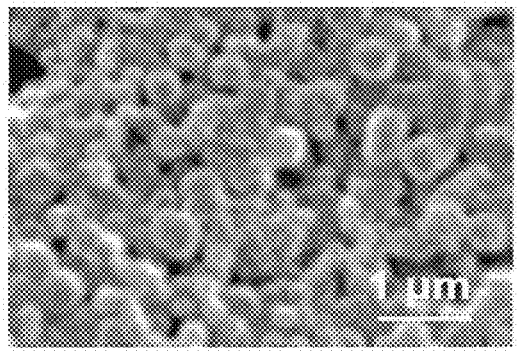
FIG. 7 is a view showing an SEM image of particle obtained in Example 6.

The particle obtained by the particle size measurement using DLS had a particle size ($D_h$) of 1021 nm, a particle size distribution (PDI) of 0.83, and a coefficient of variation (CV) of 14.5%. A SEM image of the obtained particle is shown in FIG. 7.

<Example 7 Production of Core-Shell Type Polymeric Particle Having Core Including Polyvinyl Acetate and Shell Including P(P1M-NVP)>

The core-shell type polymeric particle was synthesized by the same procedure as in Example 1 except that styrene was changed to 0.200 g (2.3 mmol) of vinyl acetate.

Figure 8:
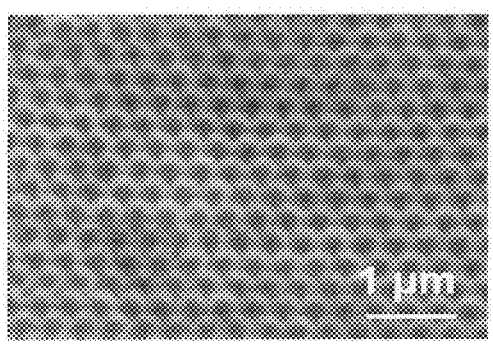
FIG. 8 is a view showing an SEM image of particle obtained in Example 7.

The particle obtained by the particle size measurement using DLS had a particle size ($D_h$) of 730 nm, a particle size distribution (PDI) of 0.12, and a coefficient of variation (CV) of 3.4%. A SEM image of the obtained particle is shown in FIG. 8.

Test Example 1: Water Dispersion Stability of Particle

About 0.5 g of sample was collected from a surface layer of the aqueous dispersion (particle content: about 5% by mass) of particle obtained in Examples 1, 5, 6, and 7, the collected sample (aqueous dispersion of particle) was placed on an aluminum dish, and the amount of moisture contained in the sample was measured by an infrared moisture meter (MA35 manufactured by Sartorius).

Next, the remaining particle dispersion was left to stand at 25° C. for 1 week as it was. After that, about 0.5 g of sample was collected from the surface layer of the particle dispersion, in the same manner as described above, and the collected sample (particle aqueous dispersion) was placed on an aluminum dish, and the amount of moisture contained in the sample was measured by the infrared moisture meter (MA35 manufactured by Sartorius).

Then, the amount of particle before leaving to stand and the amount of particle after leaving to stand were calculated from the measured amount of water before leaving to stand and amount of water after leaving to stand, respectively, and the rate (% by mass) of solidification of the particle was calculated from the following formula.

Rate (% by mass) of solidification of particle=[{
(amount of particle before leaving to stand)−
(amount of particle after leaving to stand)}/
(amount of particle before leaving to stand)]×
100

The results are shown in Table 3.

TABLE 3

|  | Rate of solidification of particle |
| --- | --- |
| Example 1 | 0% by mass |
| Example 5 | 12% by mass |
| Example 6 | 34% by mass |
| Example 7 | 0% by mass |

As shown in Table 3, the particles obtained in Examples 1, 5, 6, and 7 had good water dispersion stability. In particular, as for the particles obtained in Examples 1 and 7, a solidified product was not generated, and they had particularly excellent in water dispersion stability.

Furthermore, the particle dispersion of Example 1 was subjected to an aqueous dispersion stability test in the same manner as described above except that the period for leaving to stand was changed to 3 months. As a result, after 3 months elapsed, generation of a solidified product was not observed as described above (percentage of solidified particle=0% by mass), and it found that the particle was dispersed visually.

Test Example 2: Flame Retardance Test

A depression of 2 cm×2 cm was provided on the Teflon sheet, and the concentrated solution (the particle dispersion was centrifuged at 10,000 rpm for 30 minutes, and the precipitated particle was redispersed in water and adjusted to 50% by mass) of the particle dispersion obtained in Example 1 was cast thereon and left to stand at room temperature for 2 days. Then, it was further left to stand in a dryer at 70° C. for 2 days to prepare a film (sample A) having an average thickness of 0.75 mm. Similarly, instead of the particle dispersion, a tetrahydrofuran solution (polystyrene content: 50% by mass) of polystyrene (styrene polymer manufactured by FUJIFILM Wako Pure Chemical Corporation) was cast to prepare a membrane (sample B) having an average thickness of 0.75 mm.

The film of sample A and the membrane of sample B were picked up by tweezers, respectively, and were each flamed from the lower end for 3 seconds.

The film of sample A did not burn without residual flame, and then were flamed again for 3 seconds after 7 seconds from the end of flame contact (after 10 seconds from the start of the test). Yet, the film did not burn, and thus showed flame retardance.

Meanwhile, the membrane of sample B was burned at the same time as the flame contact, and after 7 seconds, the membrane fell with flame, and after 30 seconds, the entire membrane burned.

Figure 9:
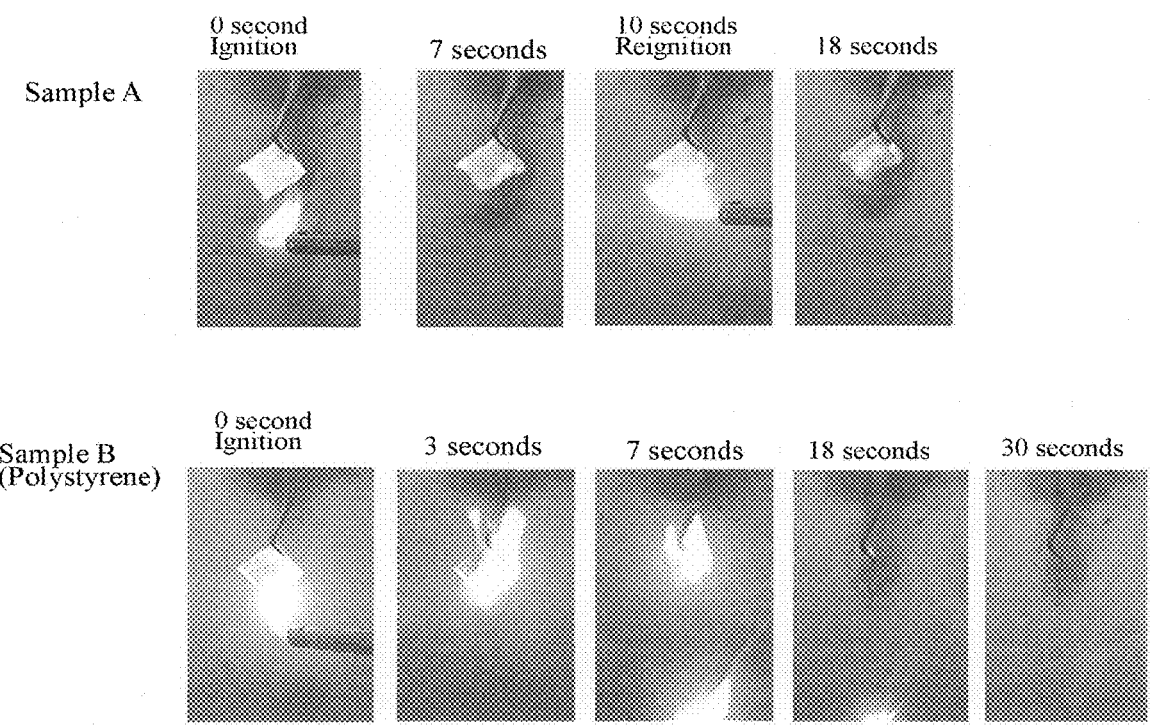
FIG. 9 is a photograph showing a temporal change of a sample during a combustion test of Test Example 2.

The temporal change of the film of sample A and the membrane of sample B during the combustion test is shown in FIG. 9.

The invention claimed is:

1. A core-shell type polymeric particle, comprising:
a core comprising a hydrophobic polymer (c); and
a shell comprising a copolymer comprising
10 to 90 mol % a repeating unit (a) derived from vinyl phosphonic acid or a vinyl phosphonic acid ester and
10 to 90 mol % a repeating unit (b) of formula (a):

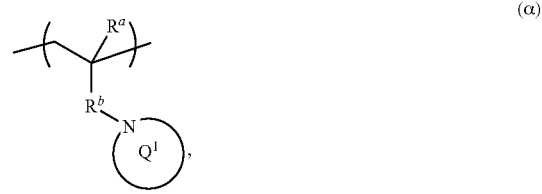

wherein
$R^a$ is H or a methyl group,
$R^b$ is a single bond or a carbonyl group,
ring $Q^1$ is a 4 to 10 membered nitrogen-comprising heterocycle; and
wherein the particle has an average particle size in a range of from 100 to 2000 nm.

2. The particle of claim 1, wherein the shell is composed of the copolymer having the repeating unit (a) and the repeating unit (b), and the core is composed of the hydrophobic polymer (c).

3. The particle of claim 1, wherein the repeating unit (a) has a formula (1):

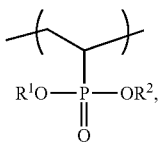

wherein
R$^1$ and R$^2$ are each independently H or an optionally substituted alkyl group comprising 1 to 6 carbon atoms, provided that when both R$^1$ and R$^2$ are alkyl groups, an oxygen atom and a phosphorus atom in the formula (1) optionally form a ring together.

4. The particle of claim 1, wherein the ring Q$^1$ is an optionally substituted pyrrolidone ring.

5. The particle of claim 1, wherein the hydrophobic polymer (c) is derived from one or more of monomers selected from the group consisting of an olefin, a vinyl aromatic compound, (meth) acrylic acid, a (meth) acrylic acid derivative, (meth) acrylamide, a (meth) acrylamide derivative, and a vinyl ester of a saturated aliphatic carboxylic acid.

6. The particle of claim 1, which is obtained by an emulsion polymerization of the copolymer having the repeating unit (a) and the repeating unit (b) and a hydrophobic monomer in an aqueous medium.

7. A molded body, comprising:
the particle of claim 1.

8. A particle dispersion, comprising:
the particle of claim 1.

9. The particle of claim 1, wherein the ring Q$^1$ is substituted.

10. The particle of claim 1, wherein the ring Q$^1$ is unsubstituted.

11. The particle of claim 1, wherein the ring Q$^1$ is a substituted pyrrolidone ring.

12. The particle of claim 1, wherein the ring Q$^1$ is an unsubstituted pyrrolidone ring.

13. The particle of claim 1, wherein the hydrophobic polymer (c) comprises, in polymerized form, an olefin, a vinyl aromatic compound, (meth)acrylic acid, a (meth) acrylic acid derivative, (meth)acrylamide, a (meth)acrylamide derivative, a vinyl ester of a saturated aliphatic carboxylic acid, or a mixture of two or more of any of these.

14. A method for producing a core-shell polymeric particle, the comprising:
performing an emulsion polymerization, in an aqueous medium, of a hydrophobic monomer and a copolymer comprising
10 to 90 mol % a repeating unit (a) derived from vinyl phosphonic acid or a vinyl phosphonic acid ester and
10 to 90 mol % a repeating unit (b) of formula (a):

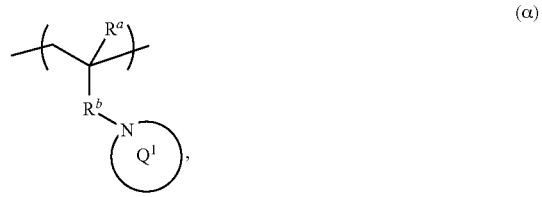

wherein
R$^a$ is H or a methyl group,
R$^b$ is a single bond or a carbonyl group,
ring Q$^1$ is an optionally substituted 4 to 10 membered nitrogen-comprising heterocycle; and
wherein the particle has an average particle size in a range of from 100 to 2000 nm.

* * * * *